(12) United States Patent
Foss

(10) Patent No.: US 9,085,335 B2
(45) Date of Patent: Jul. 21, 2015

(54) VEHICLE

(71) Applicant: Polaris Industries Inc., Medina, MN (US)

(72) Inventor: David A. Foss, Greenbush, MN (US)

(73) Assignee: Polaris Industries Inc., Medina, MN (US)

( * ) Notice: Subject to any disclaimer, the term of this patent is extended or adjusted under 35 U.S.C. 154(b) by 186 days.

(21) Appl. No.: 13/652,089

(22) Filed: Oct. 15, 2012

(65) Prior Publication Data

US 2013/0092466 A1 Apr. 18, 2013

Related U.S. Application Data

(60) Provisional application No. 61/547,385, filed on Oct. 14, 2011.

(51) Int. Cl.
*B60K 17/34* (2006.01)
*B62K 5/01* (2013.01)

(52) U.S. Cl.
CPC ........................................ *B62K 5/01* (2013.01)

(58) Field of Classification Search
CPC ................................................. B62K 2005/001
USPC .............. 180/89.1, 89.11, 311; 280/796, 798
See application file for complete search history.

(56) References Cited

U.S. PATENT DOCUMENTS

| | | | | |
|---|---|---|---|---|
| 1,069,788 | A * | 8/1913 | Johnson | 280/203 |
| 1,741,449 | A * | 12/1929 | Butcher | 5/119 |
| 4,229,018 | A * | 10/1980 | Chika | 280/203 |
| 5,012,880 | A * | 5/1991 | Abner | 180/89.11 |
| 5,509,710 | A * | 4/1996 | Eavenson et al. | 296/19 |
| 5,516,180 | A * | 5/1996 | Eavenson et al. | 296/68.1 |
| 5,702,142 | A * | 12/1997 | Newell | 296/19 |
| 7,188,880 | B1 * | 3/2007 | Frieder et al. | 296/20 |
| 7,516,998 | B1 * | 4/2009 | Berg et al. | 296/65.01 |
| 2003/0098193 | A1 * | 5/2003 | Ohtsu | 180/197 |
| 2004/0079561 | A1 * | 4/2004 | Ozawa et al. | 180/21 |
| 2004/0239088 | A1 * | 12/2004 | Rondeau et al. | 280/769 |
| 2009/0127813 | A1 * | 5/2009 | Stewart | 280/124.152 |

FOREIGN PATENT DOCUMENTS

EP 1600326 B1 * 6/2010

* cited by examiner

*Primary Examiner* — Joseph Rocca
*Assistant Examiner* — Conan Duda
(74) *Attorney, Agent, or Firm* — Faegre Baker Daniels LLP

(57) ABSTRACT

An all terrain vehicle is disclosed having a frame and ground engaging members supporting the frame. A driver's seat is supported by the frame, and extends along a first longitudinal axis. A passenger's seat is supported by the frame and extends along a second longitudinal axis, where the first and second longitudinal axes are laterally spaced apart. The passenger seat may also be movable to a second location to allow for the vehicle to support a gurney, which extends in a front to back orientation.

41 Claims, 14 Drawing Sheets

VEHICLE

RELATED APPLICATIONS

This application claims priority from U.S. Provisional patent application Ser. No. 61/547,385 filed Oct. 14, 2011, the subject matter of which is incorporated herein by reference.

FIELD OF THE INVENTION

The present disclosure relates to all-terrain vehicles (ATVs) having a driver seat laterally displaced from a centerline of the vehicle.

BACKGROUND AND SUMMARY

ATVs and side by side vehicles are well known in the powersports and recreational industry, and their utility is becoming known in other industries as well, such as medical uses, military uses and the like, due to their versatility and low cost.

In an embodiment disclosed herein, an all terrain vehicle comprises a frame; ground engaging members supporting the frame; a driver seat supported by the frame, where the driver's seat extends along a first longitudinal axis; and a passenger seat is supported by the frame, rearward of the driver's seat, and extends along a second longitudinal axis, where the first and second longitudinal axes are laterally spaced apart.

In another embodiment disclosed herein, an all terrain vehicle comprises a frame; ground engaging members supporting the frame; a driver seat supported by the frame, where the driver's seat extends along a first longitudinal axis; and a support assembly extends along a second longitudinal axis where the first and second longitudinal axes are laterally spaced apart.

In a further embodiment disclosed herein, an all terrain vehicle comprises a frame; ground engaging members supporting the frame; a driver seat supported by the frame, where the driver seat extends along a first longitudinal axis; and a longitudinal centerline of the vehicle extends along a second longitudinal axis; the first and second longitudinal axes being laterally spaced apart.

In yet another embodiment, an all terrain vehicle comprises a frame and ground engaging members supporting the frame. A drive train is supported by the frame and is drivingly coupled to the ground engaging members. The drive train extends along a first longitudinal axis and the vehicle has a longitudinal centerline laterally spaced apart the first longitudinal axis.

An embodiment according to the disclosure will now be described by way of the attached drawings. The foregoing aspects and many of the intended advantages of this invention will become more readily appreciated as the same becomes better understood by reference to the following detailed description when taken in conjunction with the accompanying drawings.

DETAILED DESCRIPTION

The embodiments disclosed below are not intended to be exhaustive or to limit the invention to the precise forms disclosed in the following detailed description. Rather, the embodiments are chosen and described so that others skilled in the art may utilize their teachings. For example, while the following description refers primarily to an all terrain vehicle, it should be understood that the invention may have application to other types of vehicles, such as snowmobiles, watercraft, utility vehicles, and golf carts.

Figure 1:
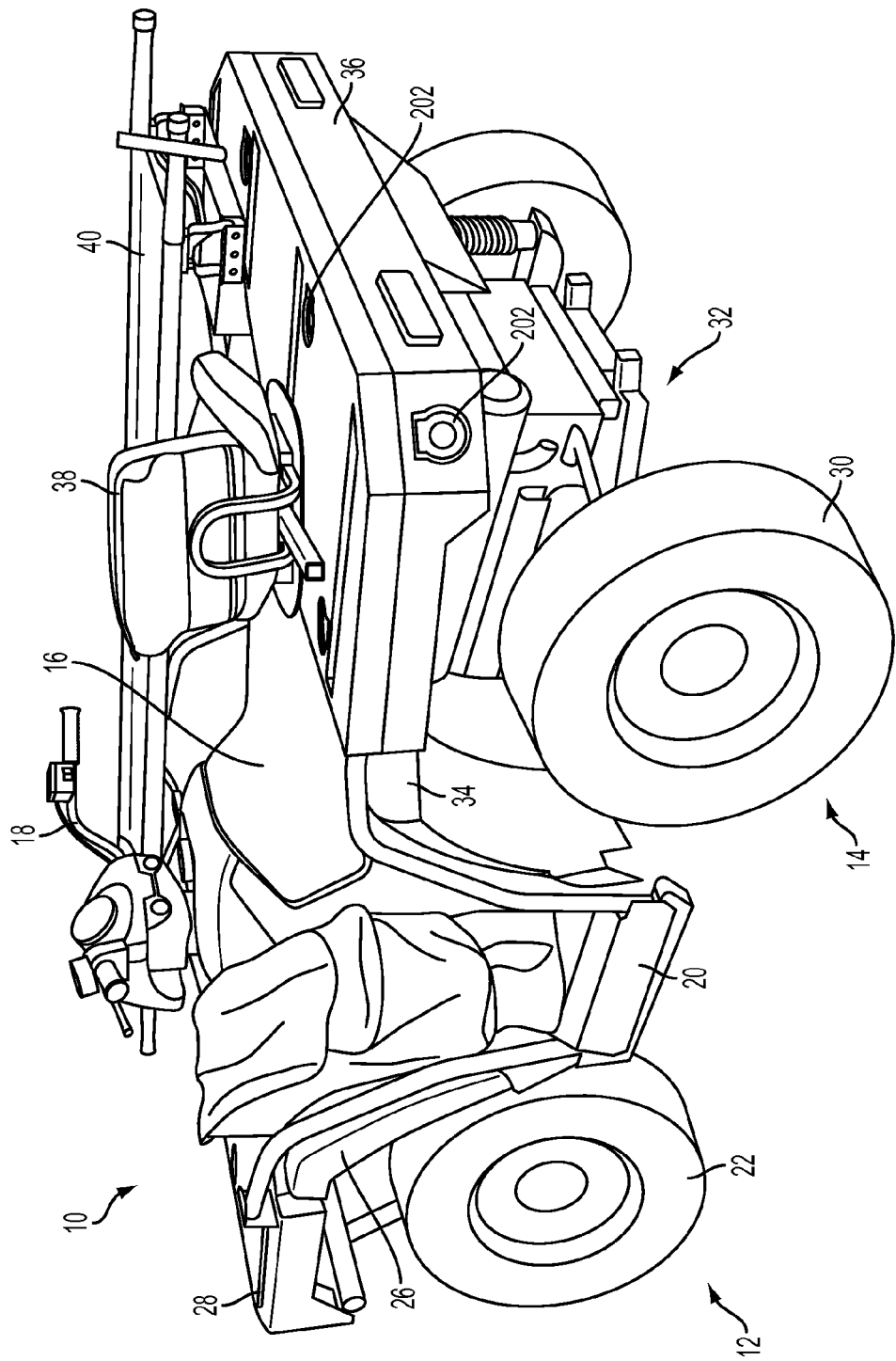
FIG. 1 shows a left rear perspective view of the vehicle of the present application.
Figure 2:
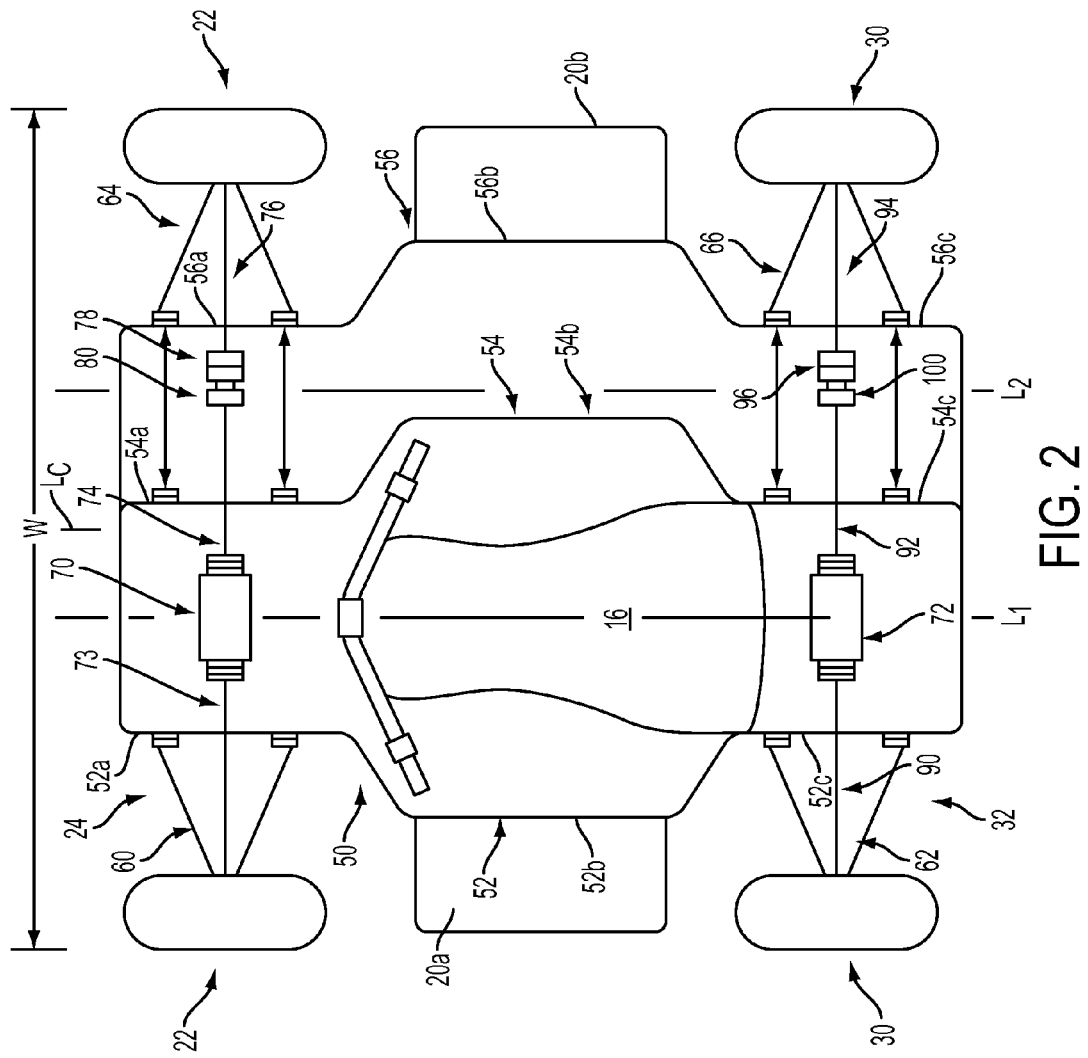
FIG. 2 shows a top diagrammatical view of the frame and powertrain of the vehicle of FIG. 1.

Referring initially to FIGS. 1 and 2, one illustrative embodiment of an all terrain vehicle (ATV) 10 is shown. It should be understood that the ATV described herein is substantially similar to Applicant's Sportsman® style ATV, and to those shown in U.S. Pat. Nos. 7,845,452; 8,075,007; 8,091,657; 8,146,932; and 8,157,044 or U.S. application Ser. No. 12/272,377; and/or PCT application PCT/US08/06097 (PCT Publication Number WO 2008/143836), the subject matter of which are all fully incorporated herein by reference. The ATV however has been modified from the vehicle described above, as disclosed herein.

ATV 10 includes front end 12, rear end 14, straddle-type seat 16, and handlebar assembly 18. Front end 12 and rear end 14 are separated by footwells 20 on both lateral sides of ATV 10 and are separated by seat 16. Front end 12 is supported by front wheels 22 and front suspension 24 (FIG. 2), which is discussed in greater detail below. Front end 12 also includes front panel 26 which may include a front support platform 28. Handlebar assembly 18 is operably coupled to front wheels 22 to allow a driver to steer ATV 10 when supported by seat 16 and/or footwells 20.

Rear end 14 is supported by rear wheels 30 and rear suspension 32. Rear end 14 also includes rear panel 34 and rear support platform 36. Vehicle 10 also includes passenger seat 38, which may include an accessory coupling system such as the one disclosed in U.S. Pat. No. 7,055,454, the disclosure of which is expressly incorporated herein by reference; also known as assignees' Lock & Ride® expansion coupler mounts. A supported object 40 may be held and carried by ATV 10, where in the embodiment shown; the supported object is a gurney.

With reference now to FIG. 2, frame 50 of ATV 10 in shown in diagrammatical format. As shown, frame 50 includes left frame tube 52 and right frame tubes 54 and 56. Frames 52 and 54 are the original frame tubes as described in the ATV above. Frame tube 56 is provided as a lateral extension to the right hand side of the vehicle for the purposes described herein. Left frame tube 52 includes a front frame portion 52a, a mid-frame portion 52b and a rear-frame portion 52c. It should also be appreciated that front suspension 24 includes a front left A-arm 60 coupled at an inner end to front frame portion 52a and to front left wheel 22. It should also be appreciated that rear suspension 32 includes a left rear A-arm 62 coupled at an inner end to rear frame tube portion 52c and at an outer end to rear wheel 30.

Due to the lateral extension of vehicle frame 50 by way of the addition of frame tube 56, a front right A-arm 64, as part of the front suspension 24 is moved from a coupling connection with front frame tube portion 54a to a lateral position coupled to front frame tube portion 56a. In a like manner, rear suspension 32 includes a right rear A-arm 66 which is moved from a coupling position on rear frame tube portion 54c to the position shown at rear frame tube portion 56c. While the lateral spacing of the frame tubes 54 and 56 is somewhat arbitrary, the additional spacing of 10-12 inches provides the adequate lateral extension for the purposes described herein. In the embodiment shown, the lateral spacing between frame tubes 54 and 56 is approximately 11" and the width W (FIGS. 2 and 7) is 60 inches or less.

Figure 3:
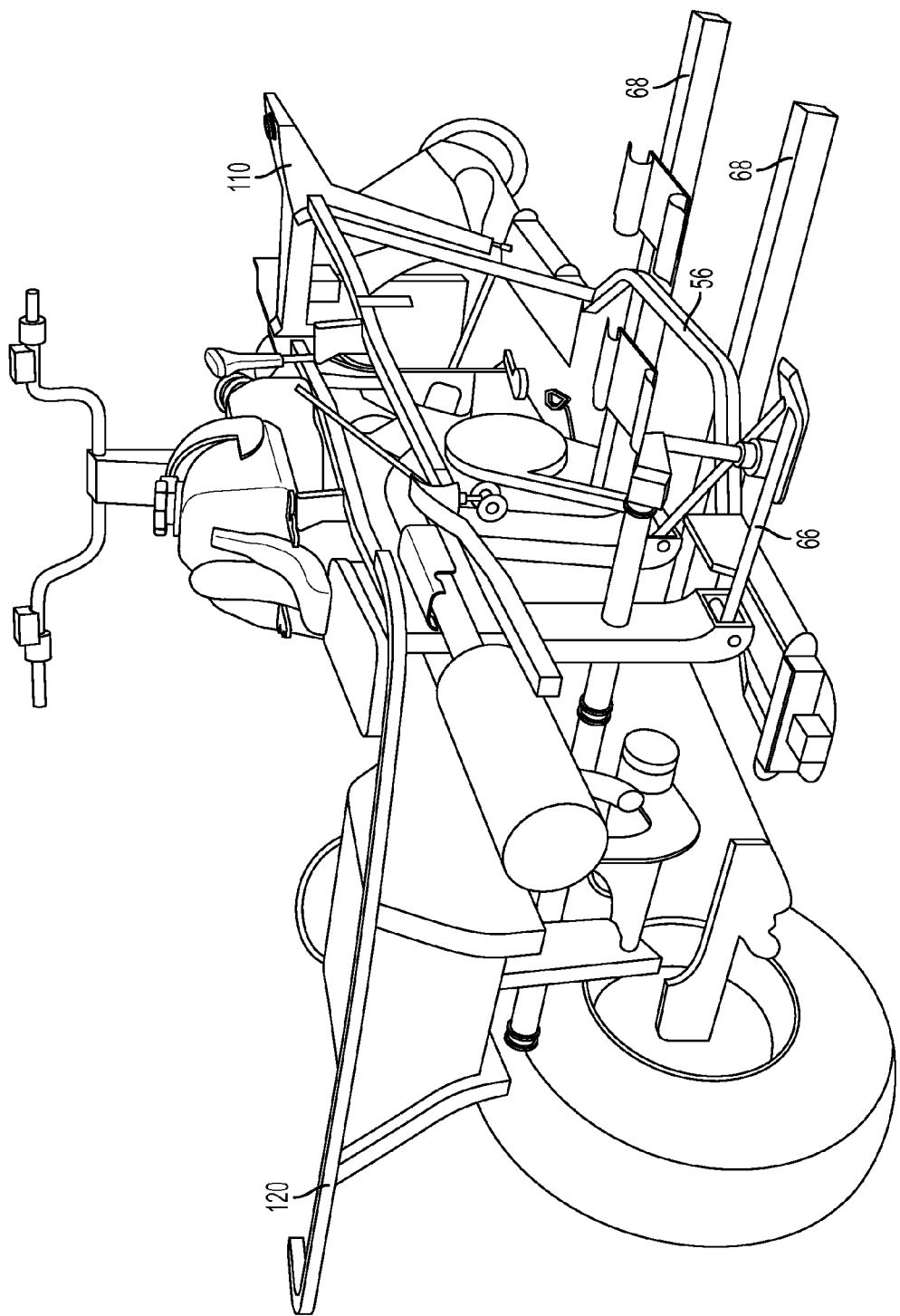
FIG. 3 shows the vehicle of FIG. 1 in a partially assembled state.
Figure 4:
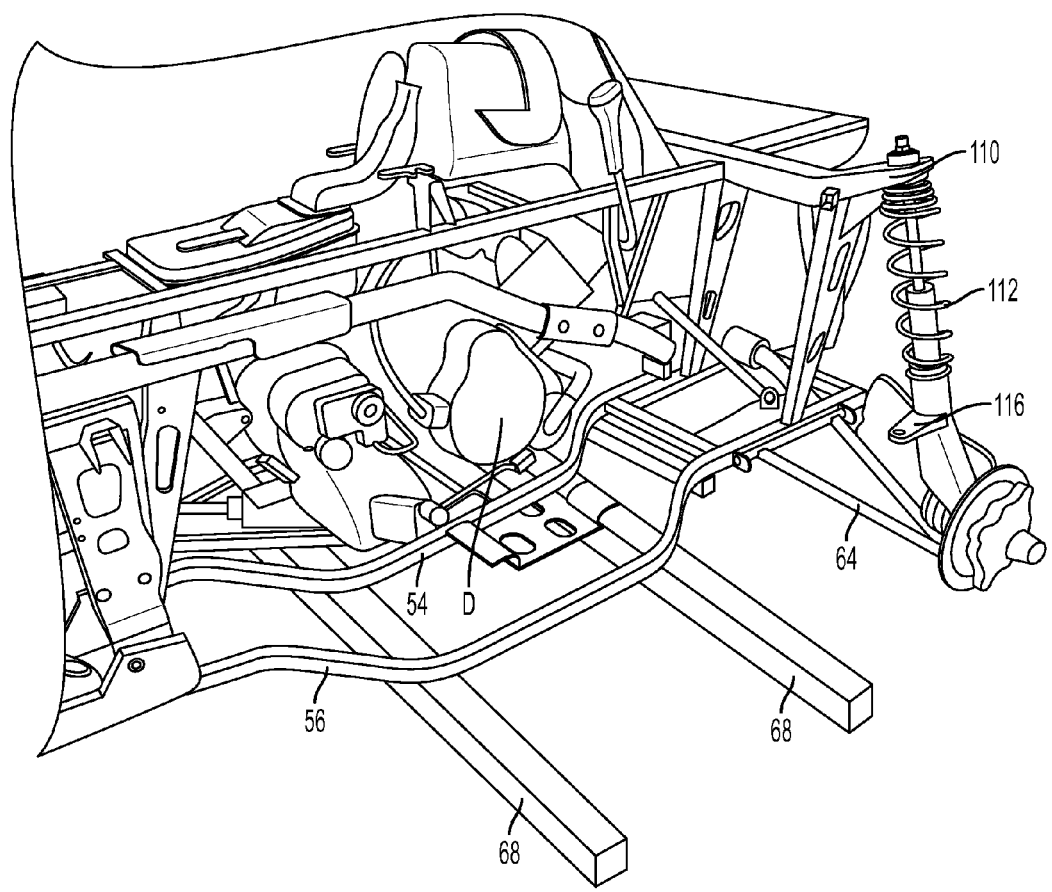
FIG. 4 is a right-hand side view of the vehicle of FIG. 3.

As shown in FIGS. 3 and 4, outrigger frame tubes 68 have been added to frame 50 to support the lateral extension of the frame and for the right foot pedestals. As shown in FIG. 2, foot pedestal 20a is supported by the left frame tube 52 and foot pedestal 20b is supported by the extended right frame tube 56 and outrigger tubes 68.

As shown best in FIGS. 2 and 4, a drive train D of ATV 10 (FIG. 4) includes an engine and transmission as is more fully described in our patent application Ser. Nos. 12/069,511; 12/069,521; 12/961,301 and/or U.S. Pat. No. 7,845,452, the subject matter of which are all fully incorporated herein by reference. It should also be appreciated that drivetrain D extends generally along the first longitudinal axis. Drivetrain D would also include front and rear longitudinally extending drive shafts extending forwardly and rearwardly from the drivetrain D and driving coupled to the front and rear wheels 22, 30, respectively. Drivetrain D would further include a front drive 70 (which may be a differential) and a rear drive 72 (which may be a differential). Front drive 70 is coupled to a left drive shaft 73 which couples to left front wheel 22. Front drive 70 is also coupled to a right drive shaft 74 having an extension shaft 76 attached by way of a coupler 78 such as a U-joint. Drive shaft 74 may be supported by a pillow block bearing such as 80. Rear drive 72 is coupled to a left rear drive shaft 90 which is drivingly coupled to left rear wheel 30. Rear drive 72 is also coupled to right rear drive shaft 92 which in turn is coupled to a right rear extension 94 attached to shaft 92 by way of a U-joint 96. Drive shaft 92 may be supported by way of a pillow block bearing at 100.

Figure 5:
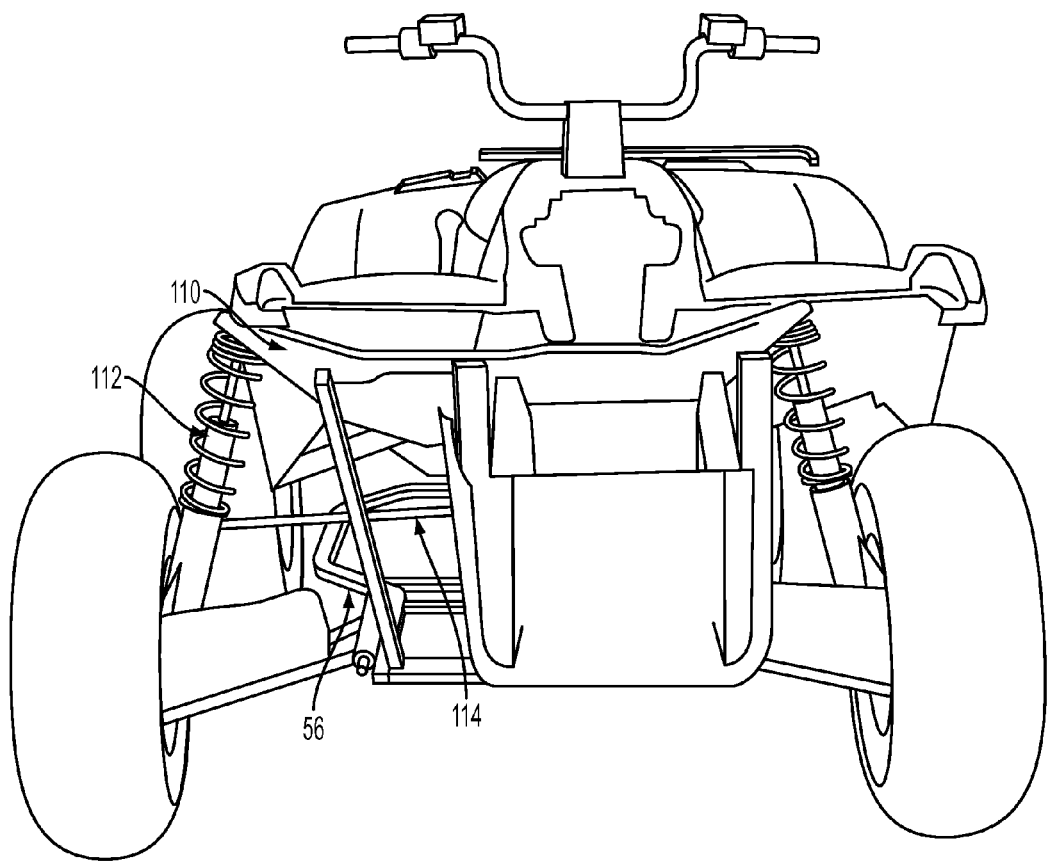
FIG. 5 is a front view of the vehicle the front and rear platforms.
Figure 6:
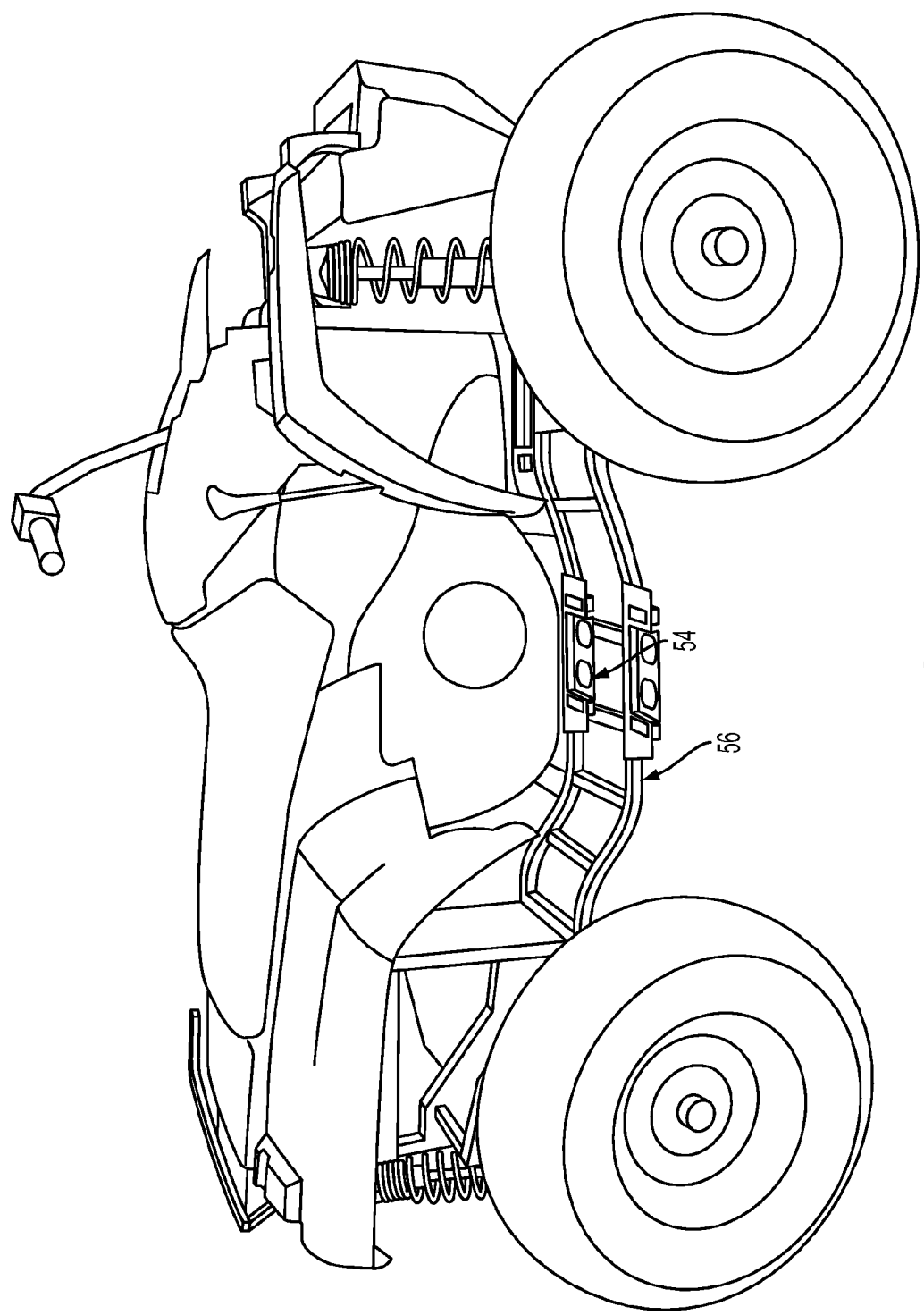
FIG. 6 shows a side view of the vehicle of FIG. 5 in a partially assembled configuration.

With reference now to FIG. 3-5, the steering is also somewhat modified due to the lateral extension. As shown, a shown modified shock tower 110 is added which is asymmetrical, and which positions strut 112 (FIG. 4) laterally outward due to the lateral extension. An elongate steering arm 114 (FIG. 5) is provided which connects to steering link 116 (FIG. 4). Otherwise, the steering is substantially similar to that shown in the above mentioned patents and patent applications. The steering may also include power steering, where the steering motor is supported by the front differential as described in U.S. patent application Ser. No. 12/228,597, the subject matter of which is incorporated herein by reference.

Figure 7:
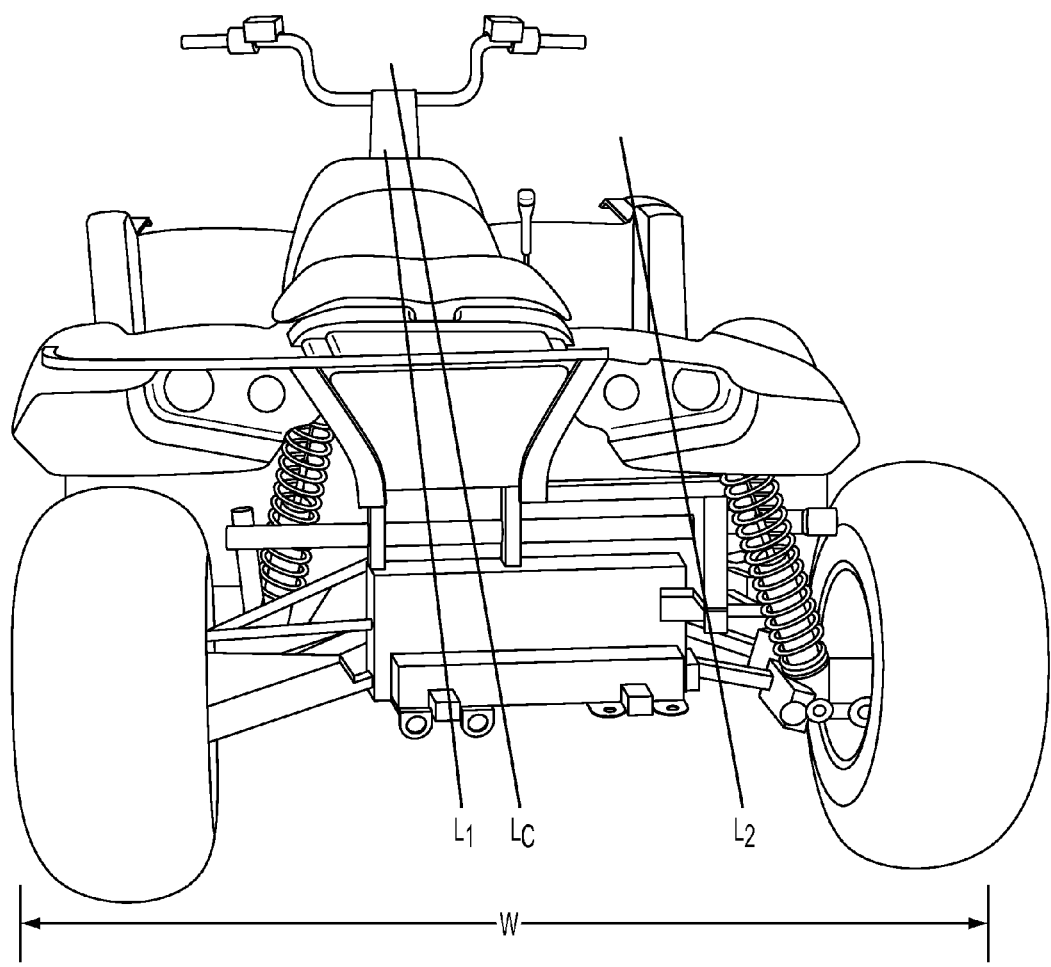
FIG. 7 is a rear view of the vehicle of FIG. 5.
Figure 8:
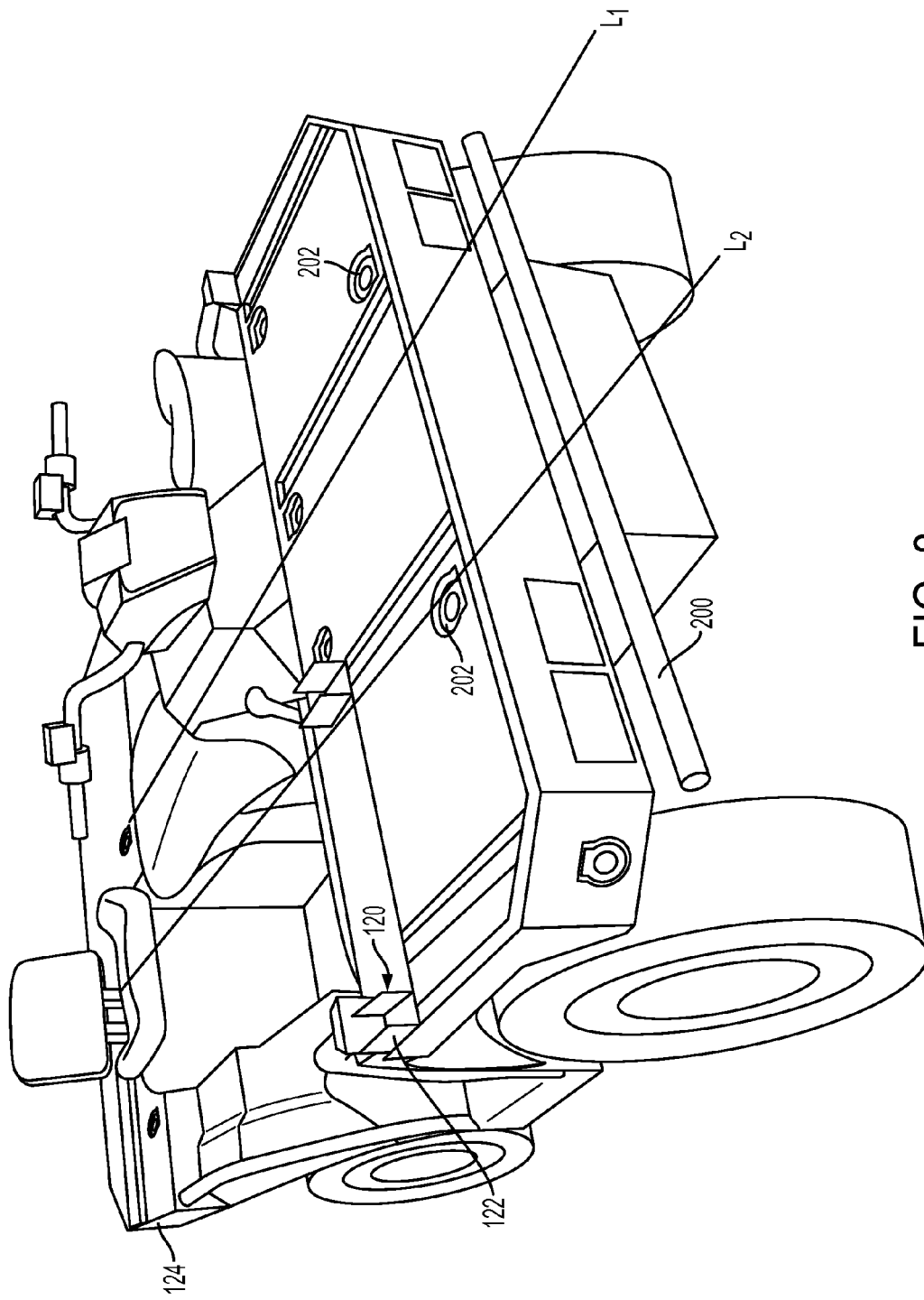
FIG. 8 shows a front view of the vehicle.
Figure 9:
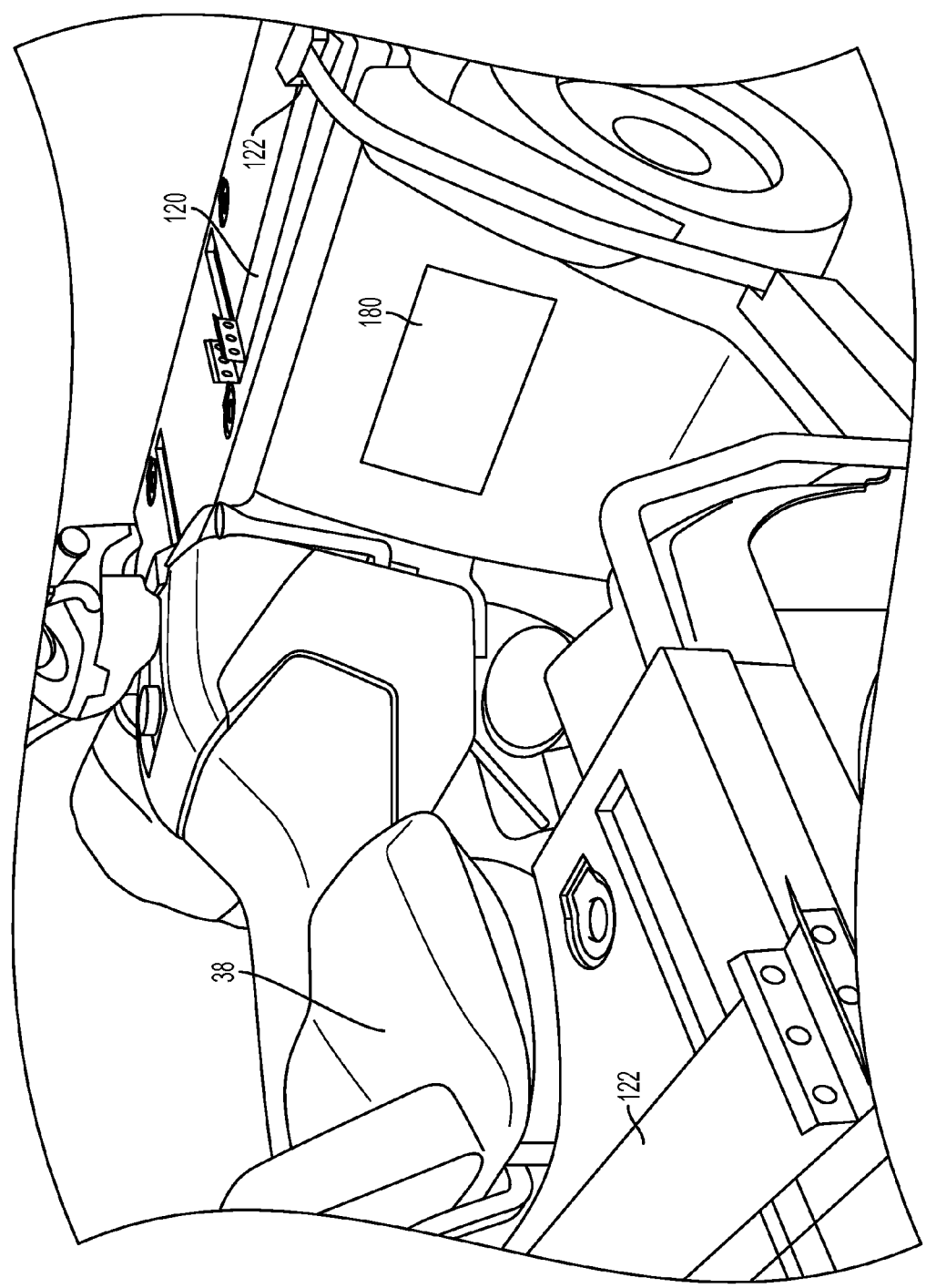
FIG. 9 is a right rear perspective view of the vehicle of FIG. 8.
Figure 10:
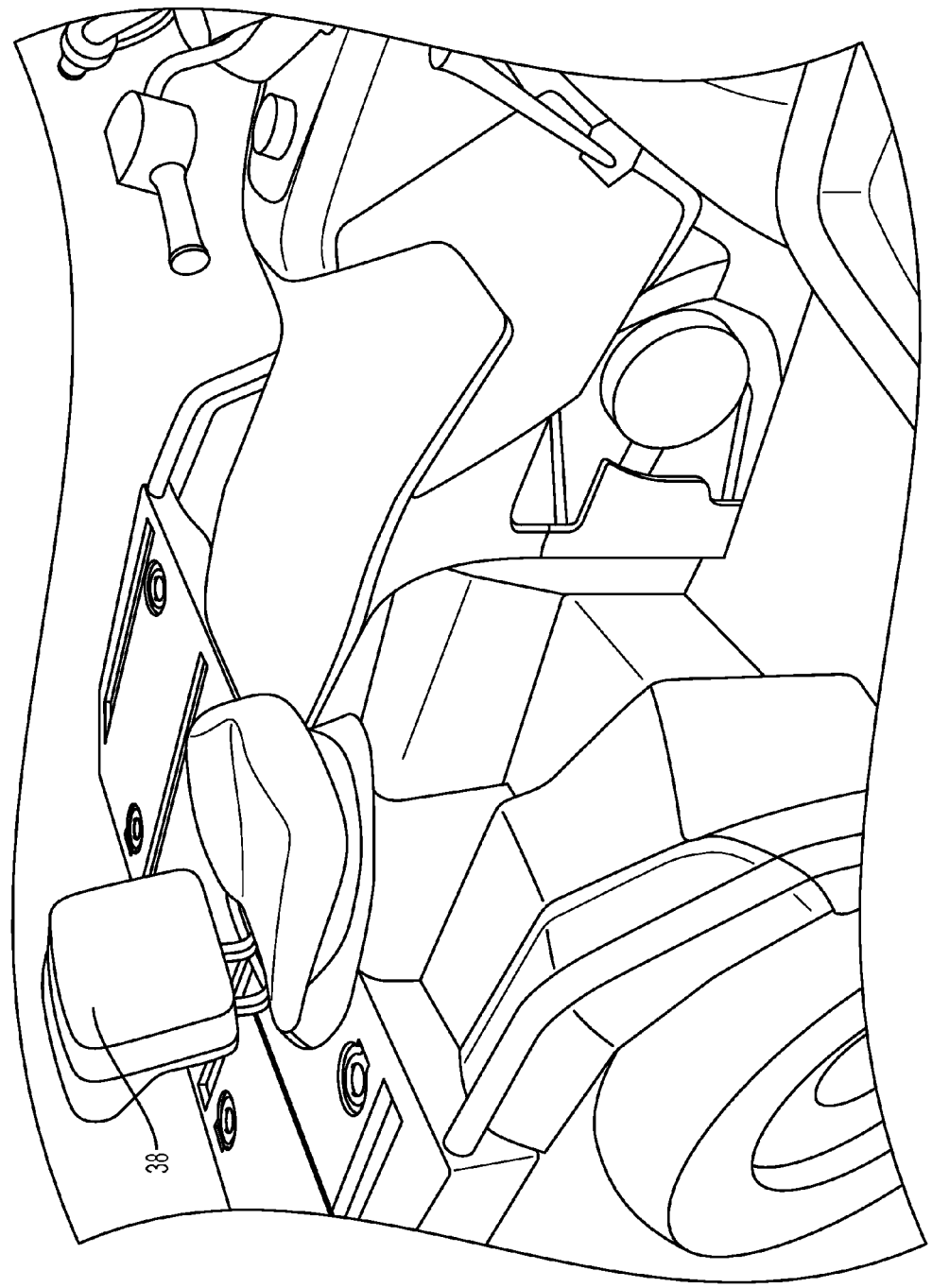
FIG. 10 is a right front perspective view of the vehicle of FIG. 9 showing an enlarged view of the passenger seating area.
Figure 11:
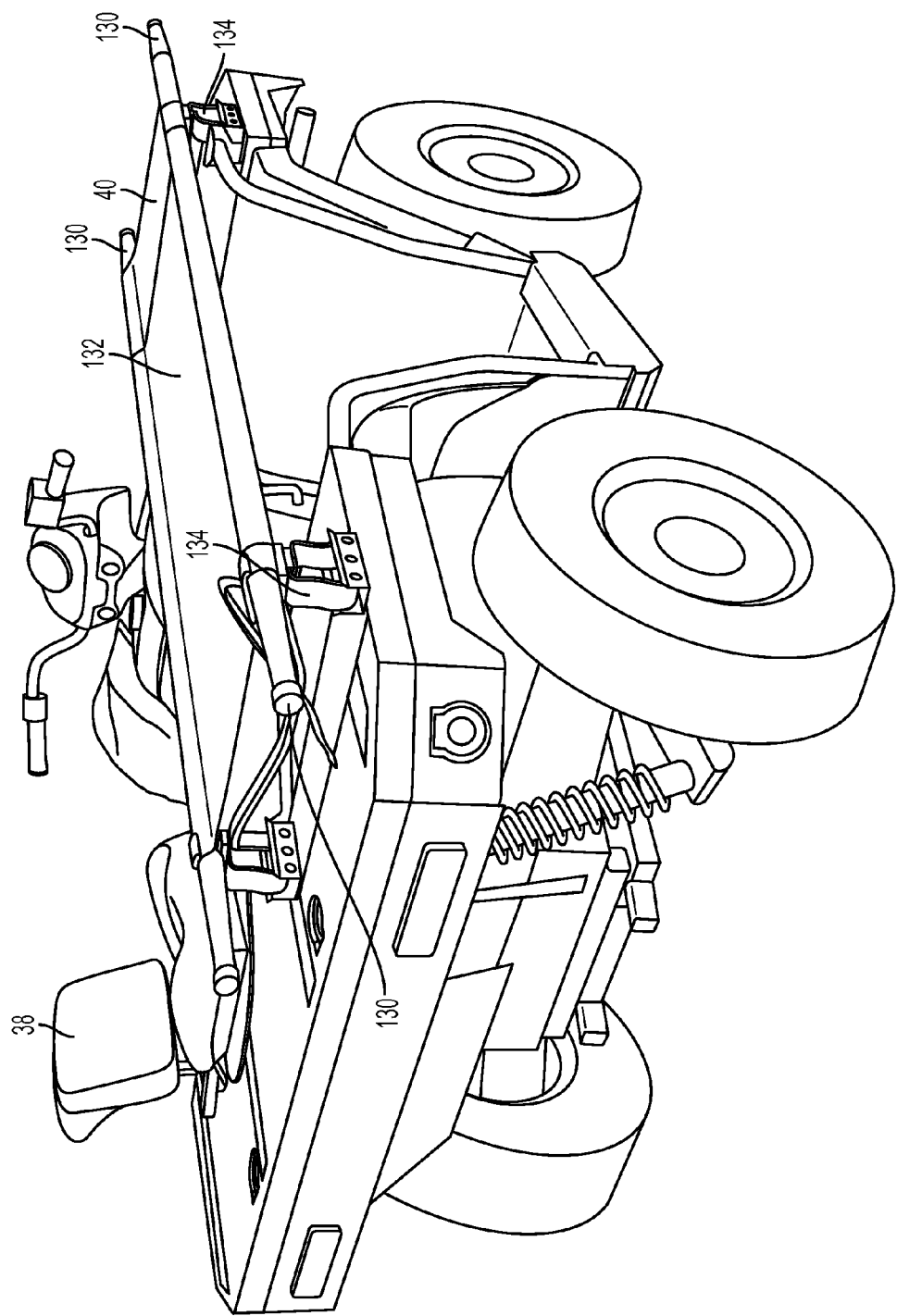
FIG. 11 is a right rear respective view of the passenger seat moved to a second position with a gurney positioned in a front-to-back supportive condition laterally offset from the driver.

As shown in FIG. 3, a rear frame support is shown at 120, which together with shock tower 110 provide front and rear supports for front and rear platforms 28, 36. As shown in FIGS. 5-8, the lateral extension provided by frame tube 56 defines an asymmetry to the vehicle such that the driver seat 16 and drivetrain D are provided along a first longitudinal axis L1 (FIG. 7) and the passenger seat may be provided along a second longitudinal axis L2 (FIG. 7). As shown, L2 is laterally displaced to the right of L1, when the passenger seat 38 is in the first position as shown in FIGS. 8-10. It should also be noted that the vehicle 10 includes a longitudinal centerline LC (FIG. 7) wherein the first longitudinal axis $L_1$ is positioned laterally on one side of the longitudinal centerline LC and the second longitudinal axis $L_2$ is positioned laterally on the other side of the central longitudinal centerline.

As also shown in FIGS. 8-12, ATV 10 also includes a support assembly 120 including front and rear brackets 122, 124. A supported object 40, such as a gurney, may be supported by the front and rear platforms and held in place by the support assembly 120. The gurney 40 may have elongate support poles 130, a support canvas 132, and support feet 134. Feet 134 would correspond to front and rear brackets 122, 124 to hold gurney 40 in position by way of fasteners or latches (not shown).

Figure 13:
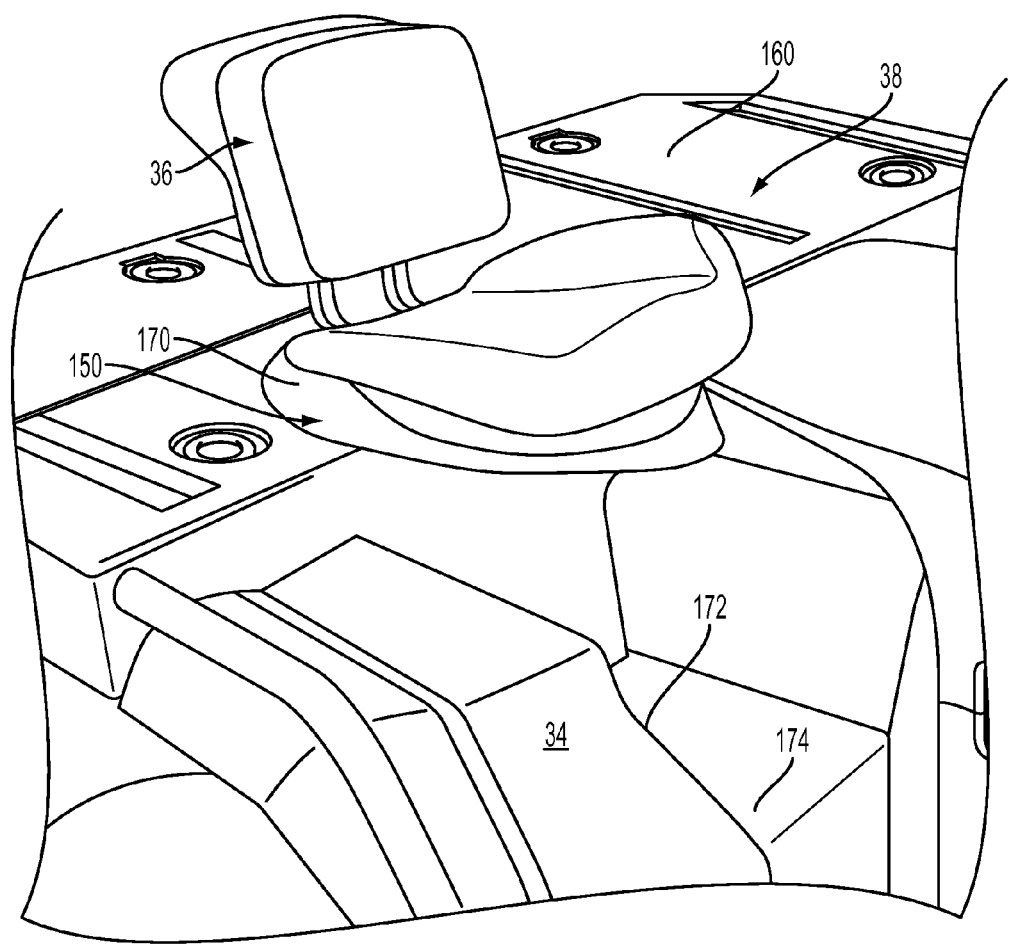
FIG. 13 is an enlarged view of the passenger seat in the first position.
Figure 14:
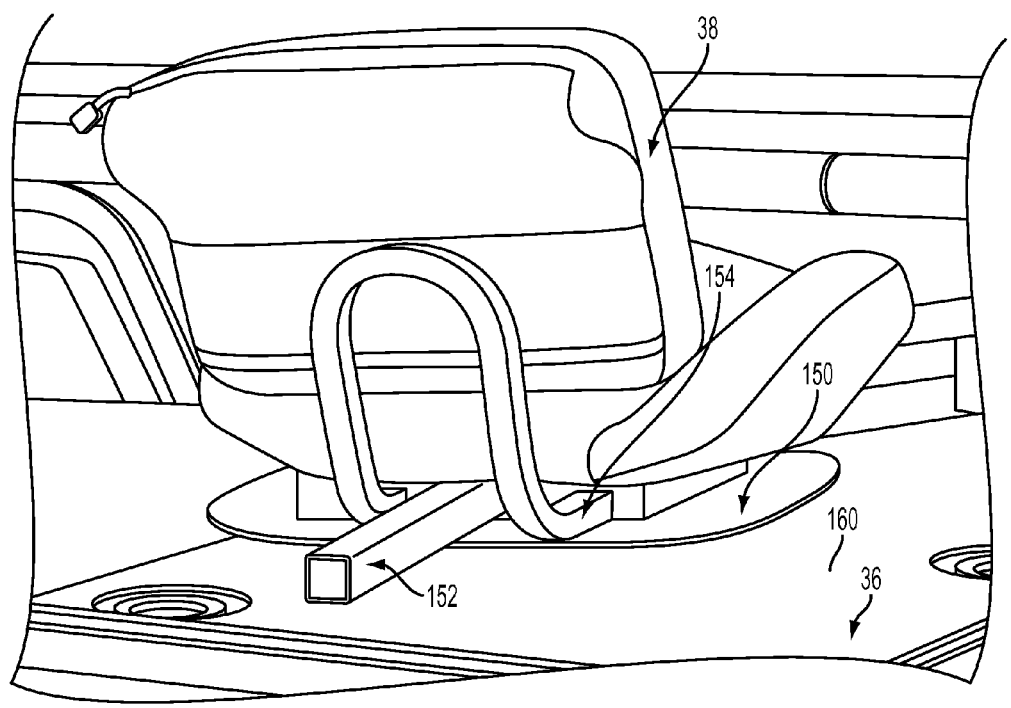
FIG. 14 is an enlarged view of the passenger seat in the second position.

As shown in FIGS. 13 and 14, passenger seat 36 includes a seat pedestal 150 having a support tube 152 (FIG. 14) extending outwardly therefrom. To support the passenger seat 38 in the first position, the position of FIG. 13, the tube 152 is interlocked with a complementary tube, which extends below top surface 160 of rear platform 36. Seat 38 and pedestal 150 are positioned within a recess 170 of top surface 160 of rear platform 36. As shown in FIG. 13, rear panel 34 is provided with a recess 172 allowing for the passenger's feet and legs, and a pedestal 174 allows for the support of the passenger's feet.

Passenger seat 38 is moved to a second position, when gurney 40 is used. Passenger seat 38 is movable between the first position (position shown in FIGS. 8-10 and 13) and the second position (position shown in FIGS. 1, 11, 12 and 14). Passenger seat 38 includes a coupling assembly including couplers 154 (FIG. 14) which locks seat 38 to the top surface 160 of rear platform 36. Couplers 154 may be similar to those disclosed in U.S. Pat. No. 7,055,454, the disclosure of which is expressly incorporated by reference herein. It should be appreciated that when in the second position, passenger positioned in passenger seat may provide care or assistance to a wounded person situated on gurney 40, while a driver in driver's seat 16 drives vehicle 10.

Figure 12:
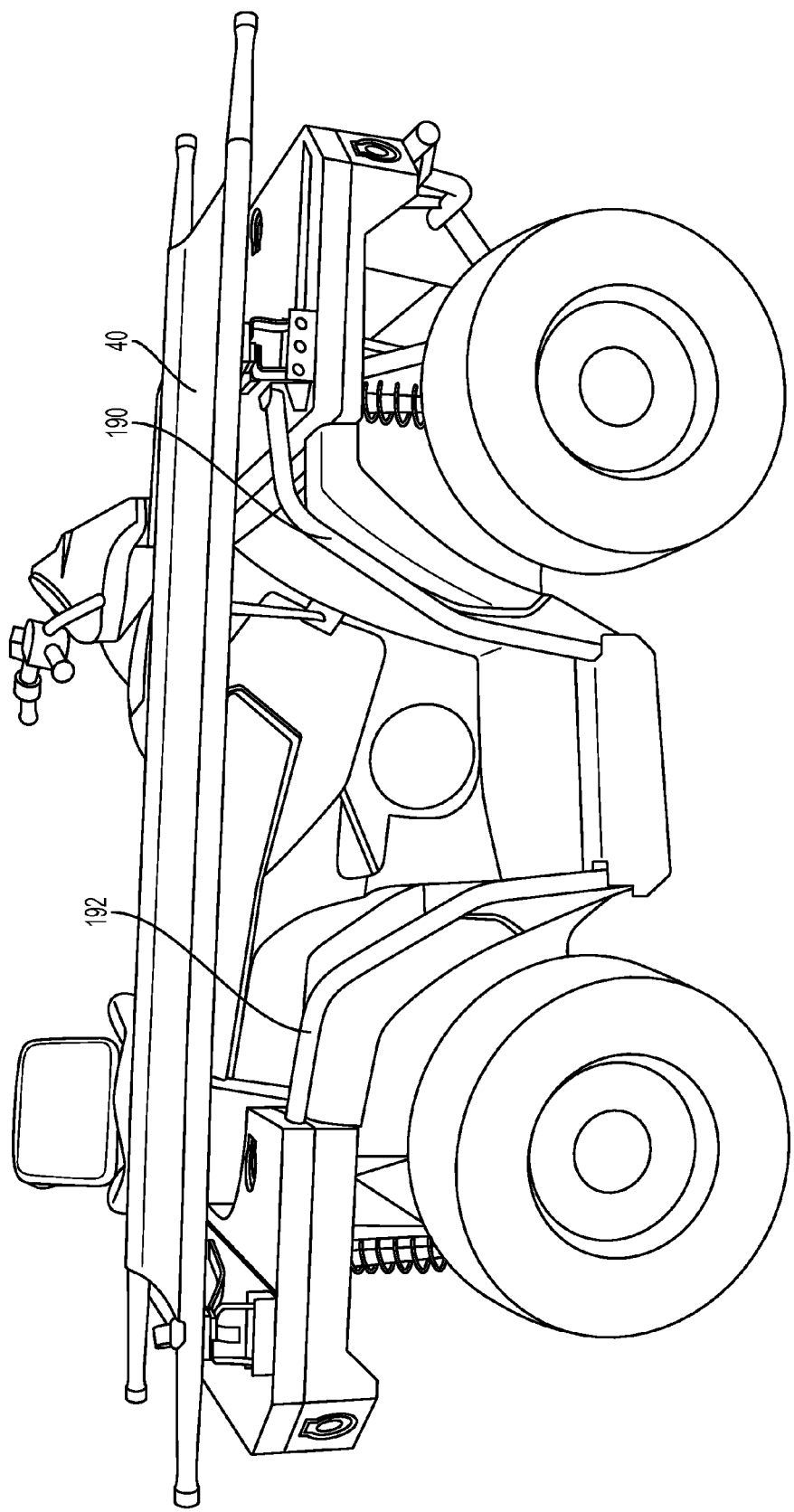
FIG. 12 is a right-hand side view of the vehicle and gurney as shown in FIG. 11.

Other features may be incorporated into the vehicle described above, such as any of the features disclosed in U.S. patent application Ser. No. 12/079,082, the disclosure of which is expressly incorporated by reference herein. Also as shown in FIG. 9, a compartment 180 is provided which may house the folded up gurney 40. Other compartment features may also be added, for example the features as shown in Applicant's U.S. Pat. No. 7,950,486; the subject matter of which is incorporated herein by reference. Some features may be added for military use such as the rigidified front and rear platforms 28 and 35 (FIG. 1), rigidified brush guard 200 (FIG. 8); integrated D-rings 202 (FIGS. 1 and 8); rigidified foot pedestals 20 (FIG. 1), and support tubes 190 and 192 (FIG. 12).

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

The invention claimed is:

1. An all terrain vehicle, comprising:
   a frame;
   ground engaging members supporting the frame;
   a driver seat supported by the frame, the driver seat extending along a first longitudinal axis;
   a front platform positioned forwardly of the driver seat;
   a rear platform positioned rearwardly of the driver seat; and
   a passenger seat supported by the frame in a first position, rearward of the driver's seat and extending along a second longitudinal axis, the first and second longitudinal axes being laterally spaced apart, and being movable between the first position and a second position on the rear platform to provide spacing for a supported object on the rear platform;
   wherein the supported object may extend from the front platform to the rear platform to be supported generally along or adjacent to the second longitudinal axis, spaced from the first longitudinal axis.

2. The all terrain vehicle of claim 1, wherein the vehicle includes a central longitudinal centerline and wherein the first longitudinal axis is positioned laterally on one side of the central longitudinal centerline and the second longitudinal axis is positioned laterally on the other side of the central longitudinal centerline.

3. The all terrain vehicle of claim 1, wherein the passenger seat is movable from a position along the second longitudinal axis to an alternate position spaced from the second longitudinal axis; the first and second longitudinal axes being laterally spaced apart.

4. The all terrain vehicle of claim 1, wherein the driver seat is a straddle seat.

5. The all terrain vehicle of claim 1, further comprising the supported object which is a gurney.

6. The all terrain vehicle of claim 1, further comprising a drive train having a longitudinal axis substantially coincident with the first longitudinal axis.

7. The all terrain vehicle of claim 6, wherein the drive train comprises a rear differential, a left rear stub shaft and a right rear stub shaft, where the right rear stub shaft is longer than the left rear stub shaft.

8. The all terrain vehicle of claim 7, wherein the drive train comprises a front differential, a left front stub shaft and a right front stub shaft, where the right front stub shaft is longer than the left front stub shaft.

9. The all terrain vehicle of claim 1, wherein the frame is defined by first and second generally longitudinally extending frame tubes centered about the first longitudinal axis, and a third generally longitudinally extending frame tube positioned laterally outside of one of the first or second generally longitudinally extending frame tubes.

10. The all terrain vehicle of claim 9, wherein the second longitudinal axis is positioned between the first and second longitudinally extending frame tubes.

11. The all terrain vehicle of claim 10, wherein the first and second generally longitudinally extending frame tubes define a foot pedestal for the passenger when the seat is positioned along the second longitudinal axis.

12. An all terrain vehicle, comprising:
   a frame;
   ground engaging members supporting the frame;
   a driver seat supported by the frame, the driver seat extending along a first longitudinal axis;
   a rear platform positioned rearwardly of the driver seat;
   a passenger seat supported by the rear platform wherein the passenger seat is removable to be supported by the rear platform in alternate positions; and
   a support assembly extending along a second longitudinal axis, the first and second longitudinal axes being laterally spaced apart.

13. The all terrain vehicle of claim 12, further comprising a front platform positioned forwardly of the driver seat.

14. The all terrain vehicle of claim 13, wherein the driver seat is a straddle seat.

15. The all terrain vehicle of claim 13, wherein the support assembly is located on the front and rear platform, and a supported object may extend from the front platform to the rear platform to be supported generally along or adjacent to the second longitudinal axis.

16. The all terrain vehicle of claim 15, further comprising the supported object which is a gurney.

17. The all terrain vehicle of claim 16, wherein the passenger seat is removable to be supported by the rear platform in an alternate position laterally spaced from the second longitudinal axis and the gurney.

18. The all terrain vehicle of claim 12, wherein the vehicle includes a longitudinal centerline and wherein the first longitudinal axis is positioned laterally on one side of the longitudinal centerline and the second longitudinal axis is positioned laterally on the other side of the longitudinal centerline.

19. The all terrain vehicle of claim 12, further comprising a drive train having a longitudinal axis substantially coincident with the first longitudinal axis.

20. The all terrain vehicle of claim 19, wherein the drive train comprises a rear differential, a left rear stub shaft and a right rear stub shaft, where the right rear stub shaft is longer than the left rear stub shaft.

21. The all terrain vehicle of claim 20, wherein the drive train comprises a front differential, a left front stub shaft and a right front stub shaft, where the right front stub shaft is longer than the left front stub shaft.

22. An all terrain vehicle, comprising:
   a frame;
   ground engaging members supporting the frame;
   a driver seat supported by the frame, the driver seat extending along a first longitudinal axis;
   a passenger seat supported by the frame, rearward of the driver's seat, and extending along a second longitudinal axis; the first and second longitudinal axes being laterally spaced apart;
   a front platform positioned forwardly of the driver seat;
   a rear platform positioned rearwardly of the driver seat; and
   the vehicle having a longitudinal centerline laterally spaced apart the first longitudinal axis;
   wherein a supported object may extend from the front platform to the rear platform to be supported generally along or adjacent to the second longitudinal axis; and
   wherein the passenger seat is movable from a position along the second longitudinal axis to an alternate position supported by the rear platform spaced from the supported object.

23. The all terrain vehicle of claim 22, wherein the first longitudinal axis is positioned laterally on one side of the longitudinal centerline and the second longitudinal axis is positioned laterally on the other side of the longitudinal centerline.

24. The all terrain vehicle of claim 22, wherein the driver seat is a straddle seat.

25. The all terrain vehicle of claim 22, further comprising the supported object which is a gurney.

26. The all terrain vehicle of claim 22, further comprising a drive train having a longitudinal axis substantially coincident with the first longitudinal axis.

27. The all terrain vehicle of claim 26, wherein the drive train comprises a rear drive, left and right rear stub shafts driven by the rear dive, where the right rear stub shaft is longer than the left rear stub shaft.

28. The all terrain vehicle of claim 27, wherein the drive train comprises a front drive, left and right front stub shafts driven by the front dive, where the front stub shaft is longer than the left front stub shaft.

29. An all terrain vehicle, comprising:
a frame;
ground engaging members supporting the frame;
a drive train supported by the frame and drivingly coupled to the ground engaging members, the drive train extending along a first longitudinal axis;
a driver seat supported by the frame, the driver seat extending along the first longitudinal axis;
a rear platform positioned rearward of the driver seat;
a passenger seat supported by the frame in a first position, rearward of the driver seat, and extending along a second longitudinal axis, the first and second longitudinal axes being laterally spaced apart; and
the vehicle having a longitudinal centerline laterally spaced apart from the first longitudinal axis;
wherein the passenger seat is movable from the first position along the second longitudinal axis to a second position supported by the rear platform;
wherein the ground engaging members comprise front and rear wheels, wherein a distance between a first wheel axis defined by a front and rear wheel on the same side of the vehicle is spaced apart from the first longitudinal axis by a first distance, and wherein a distance between a second wheel axis defined by a front and rear wheel on an opposite side of the vehicle is spaced apart from the first longitudinal axis by a second distance, where the first distance is greater than the second distance; and
wherein a distance between the first wheel axis is spaced apart from the longitudinal centerline by a third distance, and wherein a distance between the second wheel axis is spaced apart from the longitudinal centerline by a fourth distance, where the third distance is equal to the fourth distance.

30. The all terrain vehicle of claim 29, wherein the first longitudinal axis is positioned laterally on one side of the longitudinal centerline and the second longitudinal axis is positioned laterally on the other side of the longitudinal centerline.

31. The all terrain vehicle of claim 30, further comprising a rear platform positioned rearwardly of the driver seat.

32. The all terrain vehicle of claim 30, wherein the driver seat is a straddle seat.

33. The all terrain vehicle of claim 31, further comprising a front platform positioned forwardly of the driver seat.

34. The all terrain vehicle of claim 33, wherein a supported object may extend from the front platform to the rear platform to be supported generally along or adjacent to the second longitudinal axis.

35. The all terrain vehicle of claim 34, further comprising the supported object which is a gurney.

36. The all terrain vehicle of claim 34, wherein the passenger seat is movable from a position along the second longitudinal axis to an alternate position supported by the rear platform spaced from the supported object.

37. The all terrain vehicle of claim 29, wherein the drive train comprises a rear drive, left and right rear stub shafts driven by the rear dive, where the right rear stub shaft is longer than the left rear stub shaft.

38. The all terrain vehicle of claim 37, wherein the drive train comprises a front drive, left and right front stub shafts driven by the front dive, where the front stub shaft is longer than the left front stub shaft.

39. An all terrain vehicle, comprising:
ground engaging members supporting the frame;
a driver seat supported by the frame, the driver seat extending along a first longitudinal axis;
a front platform positioned forwardly of the driver seat;
a rear platform positioned rearwardly of the driver seat;
a passenger seat supported by the frame in a first position, rearward of the driver's seat, and extending along a second longitudinal axis, the first and second longitudinal axes being laterally spaced apart;
wherein a supported object may extend from the front platform to the rear platform to be supported generally along or adjacent to the second longitudinal axis; and
wherein the passenger seat is movable from the first position along the second longitudinal axis to a second position supported by the rear platform.

40. An all terrain vehicle, comprising:
a frame;
ground engaging members supporting the frame;
a driver seat supported by the frame, the driver seat extending along a first longitudinal axis;
a front platform positioned forwardly of the driver seat;
a rear platform positioned rearwardly of the driver seat;
a passenger seat supported by the rear platform;
a support assembly extending along a second longitudinal axis, the first and second longitudinal axes being laterally spaced apart;
wherein the support assembly is located on the front and rear platform, and a supported object may extend from the front platform to the rear platform to be supported generally along or adjacent to the second longitudinal axis; and
wherein the passenger seat is removable to be supported by the rear platform in an alternate position laterally spaced from the second longitudinal axis and the supported object.

41. An all terrain vehicle, comprising:
a frame;
a driver seat supported by the frame, the driver seat extending along a first longitudinal axis;
a passenger seat supported by the frame in a first position, rearward of the driver's seat, and extending along a second longitudinal axis, the first and second longitudinal axes being laterally spaced apart;
a front platform positioned forwardly of the driver seat;
a rear platform positioned rearwardly of the driver seat;
ground engaging members supporting the frame;
a drive train supported by the frame and drivingly coupled to the ground engaging members, the drive train extending along the first longitudinal axis; and
the vehicle having a longitudinal centerline laterally spaced apart the first longitudinal axis
wherein the first longitudinal axis is positioned laterally on one side of the longitudinal centerline and the second longitudinal axis is positioned laterally on the other side of the longitudinal centerline;
wherein a supported object may extend from the front platform to the rear platform to be supported generally along or adjacent to the second longitudinal axis; and wherein the passenger seat is movable from the first position along the second longitudinal axis to a second position supported by the rear platform spaced from the supported object.

* * * * *